US010547556B2

(12) United States Patent
Kurosawa

(10) Patent No.: US 10,547,556 B2
(45) Date of Patent: Jan. 28, 2020

(54) CONTROL DEVICE, TRAFFIC CONTROL METHOD, AND COMPUTER READABLE MEDIUM

(71) Applicant: NEC CORPORATION, Tokyo (JP)

(72) Inventor: Yusuke Kurosawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 170 days.

(21) Appl. No.: 15/547,887

(22) PCT Filed: Feb. 18, 2016

(86) PCT No.: PCT/JP2016/000870
§ 371 (c)(1),
(2) Date: Aug. 1, 2017

(87) PCT Pub. No.: WO2016/136215
PCT Pub. Date: Sep. 1, 2016

(65) Prior Publication Data
US 2018/0248809 A1 Aug. 30, 2018

(30) Foreign Application Priority Data
Feb. 27, 2015 (JP) ................................. 2015-037732

(51) Int. Cl.
*H04L 12/26* (2006.01)
*H04L 12/841* (2013.01)
*H04N 21/238* (2011.01)

(52) U.S. Cl.
CPC .......... *H04L 47/28* (2013.01); *H04L 43/0888* (2013.01); *H04N 21/23805* (2013.01)

(58) Field of Classification Search
CPC ... H04L 47/28; H04L 43/0888; H04L 47/127; H04L 47/2416; H04L 47/22; H04L 47/41;
(Continued)

(56) References Cited

U.S. PATENT DOCUMENTS 7,088,677 B1 * 8/2006 Burst, Jr. ................ H04L 47/10
370/229
8,830,830 B2 * 9/2014 Mani ....................... H04L 47/10
370/230.1
(Continued)

FOREIGN PATENT DOCUMENTS

CN 1460378 A 12/2003
CN 101741847 A 6/2010
(Continued)

OTHER PUBLICATIONS

Communication dated Sep. 5, 2018 from the European Patent Office in counterpart application No. 16754966.6.
(Continued)

*Primary Examiner* — Jay P Patel
(74) *Attorney, Agent, or Firm* — Sughrue Mion, PLLC

(57) ABSTRACT

A control device includes an information analysis unit that measures communication volume in each flow included in input traffic and generates traffic information including information representing at least the measured communication volume of each of the flows and a time at which measurement is taken; a reduction target selection unit that generates ranking information representing a ranking which is a rank order of a communication volume of each of the flows in the input traffic and selects a flow having the ranking that has a trend to change in a particular direction as a reduction target flow whose communication volume is to be reduced; and a traffic control unit that reduces a communication volume on the reduction target flow, and transmits the reduction target flow subjected to the reduction processing together with another flow included in the input traffic as output traffic.

18 Claims, 6 Drawing Sheets

(58) Field of Classification Search
CPC ........... H04L 47/14; H04M 3/36; H04M 3/00; H04N 21/23805
See application file for complete search history.

(56) References Cited

U.S. PATENT DOCUMENTS

| | | | |
|---|---|---|---|
| 9,294,404 B2* | 3/2016 | Overcash | H04L 47/11 |
| 9,509,802 B1* | 11/2016 | Stalling | H04L 67/42 |
| 9,866,441 B2* | 1/2018 | Day | H04L 41/145 |
| 2005/0039086 A1 | 2/2005 | Krishnamurthy et al. | |
| 2005/0282571 A1* | 12/2005 | Oprescu-Surcobe | H04W 28/10 455/503 |
| 2012/0210142 A1 | 8/2012 | Ichiki et al. | |
| 2012/0257527 A1 | 10/2012 | Jorgensen | |
| 2013/0286837 A1* | 10/2013 | Khanchi | H04L 47/127 370/235 |
| 2014/0056139 A1 | 2/2014 | Ye | |
| 2014/0056149 A1* | 2/2014 | Mani | H04L 47/10 370/235.1 |
| 2014/0126358 A1* | 5/2014 | Bedekar | H04W 28/24 370/230 |
| 2014/0226475 A1* | 8/2014 | Stewart | H04L 47/20 370/230.1 |
| 2014/0254380 A1 | 9/2014 | Swenson et al. | |
| 2015/0200855 A1* | 7/2015 | Overcash | H04L 47/12 370/235 |

FOREIGN PATENT DOCUMENTS

| | | |
|---|---|---|
| JP | 2005-277804 A | 10/2005 |
| JP | 2006-319747 A | 11/2006 |
| JP | 2009-201107 A | 9/2009 |
| JP | 2012-060604 A | 3/2012 |
| JP | 2012-169823 A | 9/2012 |
| WO | 2014/061587 A1 | 4/2014 |

OTHER PUBLICATIONS

Communication dated Aug. 9, 2018 from the Taiwanese Patent Office in counterpart application No. 105105344.
International Search Report for PCT/JP2016/000870 dated Apr. 26, 2016.

* cited by examiner

CONTROL DEVICE, TRAFFIC CONTROL METHOD, AND COMPUTER READABLE MEDIUM

CROSS REFERENCE TO RELATED APPLICATIONS

This application is a National Stage of International Application No. PCT/JP2016/00870 filed Feb. 18, 2016, claiming priority based on Japanese Patent Application No. 2015-037732 filed Feb. 27, 2015, the contents of all of which are incorporated herein by reference in their entirety.

TECHNICAL FIELD

The present invention relates to a control device for traffic in a communication system that uses an information processing device (computer).

BACKGROUND ART

In a video distribution system or the like, an excess of bandwidth capacity sometimes occurs on a network that connects a video distribution server and terminals, due to an increase in access to a particular video content and the like. There is a known technique of reducing overall traffic volume by performing bandwidth reduction on part of traffic as a countermeasure against such an excess of bandwidth capacity.

For example, PTL 1 discloses a method of avoiding saturation of a network bandwidth when the bandwidth is to saturate. In the method described in PTL 1, a quantity of data of at least one victim stream is reduced using a compression technique or the like. PTL 1 illustrates, as one method of selecting a victim stream whose data are to be reduced, a method in which a stream that has the greatest quantity of data is selected.

Further, PTL 2 discloses a method of controlling network congestion. In the method disclosed in PTL 2, a packet of a malignant flow is tagged to indicate that the packet is precedentially discarded. A malignant flow is identified on the basis of feature information such as a duration and a communication volume of the flow.

Further, PTL 3 discloses an information intermediary device that controls congestion. In a method described in PTL 3, the information intermediary device controls an invalid flow that performs communication that exceeds a contracted bandwidth capacity. The information intermediary device selects, as an invalid flow, a flow that has the number of packets that exceeds a threshold value.

CITATION LIST

Patent Literature

[PTL 1] Japanese Laid-open Patent Publication No. 2009-201107
[PTL 2] Japanese Laid-open Patent Publication No. 2006-319747
[PTL 3] Japanese Laid-open Patent Publication No. 2005-277804

SUMMARY OF INVENTION

Technical Problem

However, the methods or the information intermediary device disclosed in PTLs 1 to 3 have a problem that reaction to a change in traffic volume is delayed. This is because bandwidth reduction is performed on the basis of a current traffic condition. Specifically, since the methods or the information intermediary device take measures to reduce a network bandwidth after a result of an increase in traffic volume has been measured, an action to reduce a bandwidth is delayed when an increase in traffic volume is rapid.

An object of the present invention is to remedy the above-described problem in taking action against a change in traffic volume. Specifically, an object of the present invention is to provide a control device and the like that reduce a delay in taking action to reduce a network bandwidth in response to a change in traffic volume.

Solution to Problem

To achieve the object described above, a control device according to one aspect of the present invention includes the following configurations.

Specifically, a control device according to one aspect of the present invention includes, information analysis unit implemented by one or more programmed processors and configured to perform measurement processing of measuring a communication volume per measurement time interval in each flow included in input traffic and generating traffic information including information representing at least the measured communication volume of each of the flows and a time at which measurement is taken;

reduction target selection unit implemented by the one or more programmed processors and configured to generate, in each of the measurement time intervals, ranking information representing a ranking which is a rank order of a communication volume of each of the flows in the input traffic, based on the traffic information, and selecting a flow having the ranking that has a trend to change in a particular direction as a reduction target flow whose communication volume is to be reduced, based on a trend of change in ranking information over a plurality of past measurement time intervals; and traffic control unit implemented by the one or more programmed processors and configured to perform reduction processing of reducing a communication volume on the reduction target flow, and transmitting the reduction target flow subjected to the reduction processing together with another flow included in the input traffic as output traffic.

To achieve the object described above, a traffic control method according to one aspect of the present invention includes, by an information processing device, performing measurement processing of measuring a communication volume per measurement time interval in each flow included in input traffic;

generating traffic information including information representing at least the measured communication volume of each of the flows and a time at which measurement is taken;

performing ranking information generation processing of generating, in each of the measurement time intervals, ranking information representing a ranking which is a rank order of a communication volume of each of the flows in the input traffic, based on the traffic information;

performing selection processing of selecting a flow having the ranking that has a trend to change in a particular direction as a reduction target flow whose communication volume is to be reduced, based on a trend of change in ranking information over a plurality of past measurement time intervals;

performing reduction processing of reducing a communication volume on the reduction target flow; and performing transmission processing of transmitting the reduction target flow subjected to the reduction processing together with another flow included in the input traffic as output traffic.

Further, the object is also accomplished by a computer program that implements the control device and the traffic control method including the above configurations by a computer, and by a computer-readable storage medium storing the computer program.

Advantageous Effects of Invention

The present invention has an advantageous effect of being able to reduce a traffic volume that exceeds a network bandwidth capacity at an early stage in response to a change in traffic volume.

DESCRIPTION OF EMBODIMENTS

Exemplary embodiments of the present invention will be described next in detail with reference to the drawings.

First Exemplary Embodiment

Figure 1:
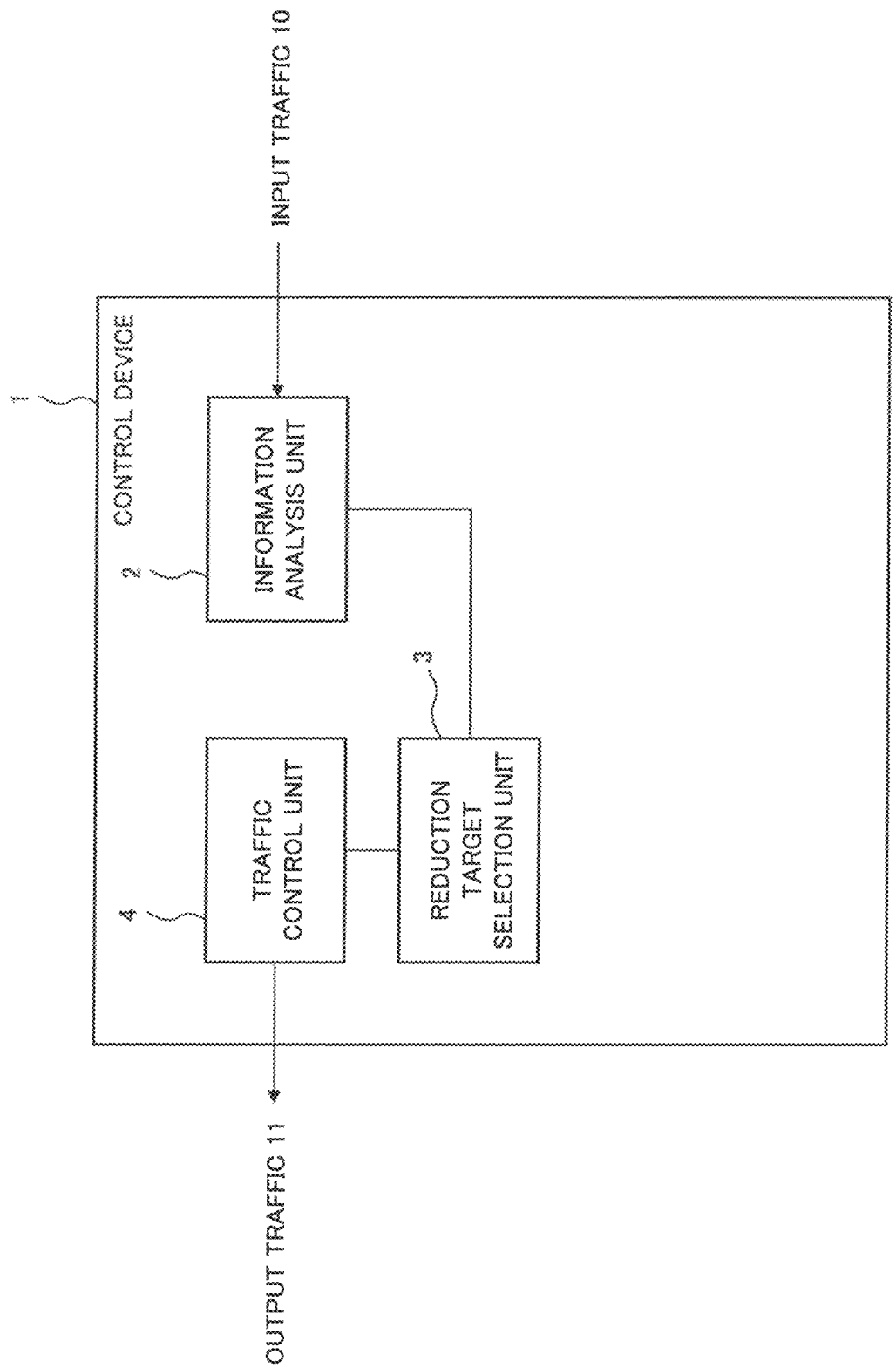
FIG. 1 is a block diagram illustrating a configuration of a control device 1 according to a first exemplary embodiment of the present invention.

FIG. 1 is a block diagram illustrating a configuration of a control device 1 according to a first exemplary embodiment of the present invention. Referring to FIG. 1, the control device 1 according to the present exemplary embodiment includes an information analysis unit 2, a reduction target selection unit 3, and a traffic control unit 4. The control device 1 may further include a storage device capable of storing traffic information. The storage device is implemented by a semiconductor memory device or a disk device, for example. The storage device may be a device located external to the control device 1.

The units of the control device 1 may be configured by dedicated hardware devices or logic circuits. Alternatively, the control device 1 may be configured by a typical information processing device (computer) which operates under the control of a computer program (software program) executed using a CPU (Central Processing Unit, not depicted). Note that an exemplary hardware configuration in which the control device 1 is implemented by a computer will be described later with reference to FIG. 6.

The information analysis unit 2 measures a communication volume per measurement time interval (unit time) in each traffic flow (hereinafter also simply referred to as a "flow") included in input traffic 10. The information analysis unit 2 then generates traffic information including at least a measured communication volume of each flow and information representing a time at which the measurement was taken. The information analysis unit 2 may store the traffic information in a storage device.

The reduction target selection unit 3 generates, in each measurement time interval, ranking information that represents a place in a rank order (ranking) of the communication volume of each flow in the input traffic 10 on the basis of traffic information. In addition, the reduction target selection unit 3 selects, on the basis of a trend of change (movement) in ranking information over a plurality of past measurement time intervals, a flow whose ranking has a trend to change in a particular direction as a target flow whose traffic (communication volume) is to be reduced (hereinafter referred to as a "reduction target flow").

The traffic control unit 4 performs bandwidth reduction processing (processing of reducing communication volume) on a selected reduction target flow. A commonly used technique such as transcoding can be employed for a means for processing the bandwidth reduction. The traffic control unit 4 then outputs the reduction target flow subjected to the bandwidth reduction processing as output traffic 11 together with other flows included in the input traffic 10.

The reduction target selection unit 3 and the traffic control unit 4 perform the operation described above until the output traffic 11 reaches a value equal to or less than a predetermined network bandwidth capacity.

As described above, the present exemplary embodiment has the advantageous effect of being able to reduce a traffic volume that exceeds the bandwidth capacity of a network at an early stage in response to a change in traffic volume.

This is because the reduction target selection unit 3 selects a flow whose communication volume ranking information has a trend to change in a particular direction as a reduction target flow whose traffic is to be reduced.

For example, if the reduction target selection unit 3 generates ranking information in which ranking rises with increasing communication volume, the reduction target selection unit 3 can select a flow whose ranking information has a rising trend as a reduction target flow. Accordingly, the reduction target selection unit 3 can select a flow as a reduction target flow at the point in time at which movement in ranking of the flow exhibits a rising trend before its communication volume becomes the highest, i.e. before the ranking of the flow reaches the top. In other words, traffic control of a flow whose communication volume is increasing can be started earlier in the present exemplary embodiment than in a case where a flow is selected as a traffic reduction target only after the ranking of the communication volume of the flow reaches the top. In this way, the present exemplary embodiment can achieve efficient bandwidth reduction finely tuned in accordance with varying access conditions. Note that the present exemplary embodiment can perform similar control in a setting in which ranking falls with increasing communication volume.

Second Exemplary Embodiment

A second exemplary embodiment based on the first exemplary embodiment described above will be described next.

The following description will focus on features according to the second exemplary embodiment and components of the second exemplary embodiment that have configurations similar to those in the first exemplary embodiment will be given the same reference signs as the reference signs given in the first exemplary embodiment, and repeated detailed description of those components will be omitted.

The present exemplary embodiment will be described with respect to one example where the present invention is applied to a communication system in which video contents are distributed.

Figure 2:
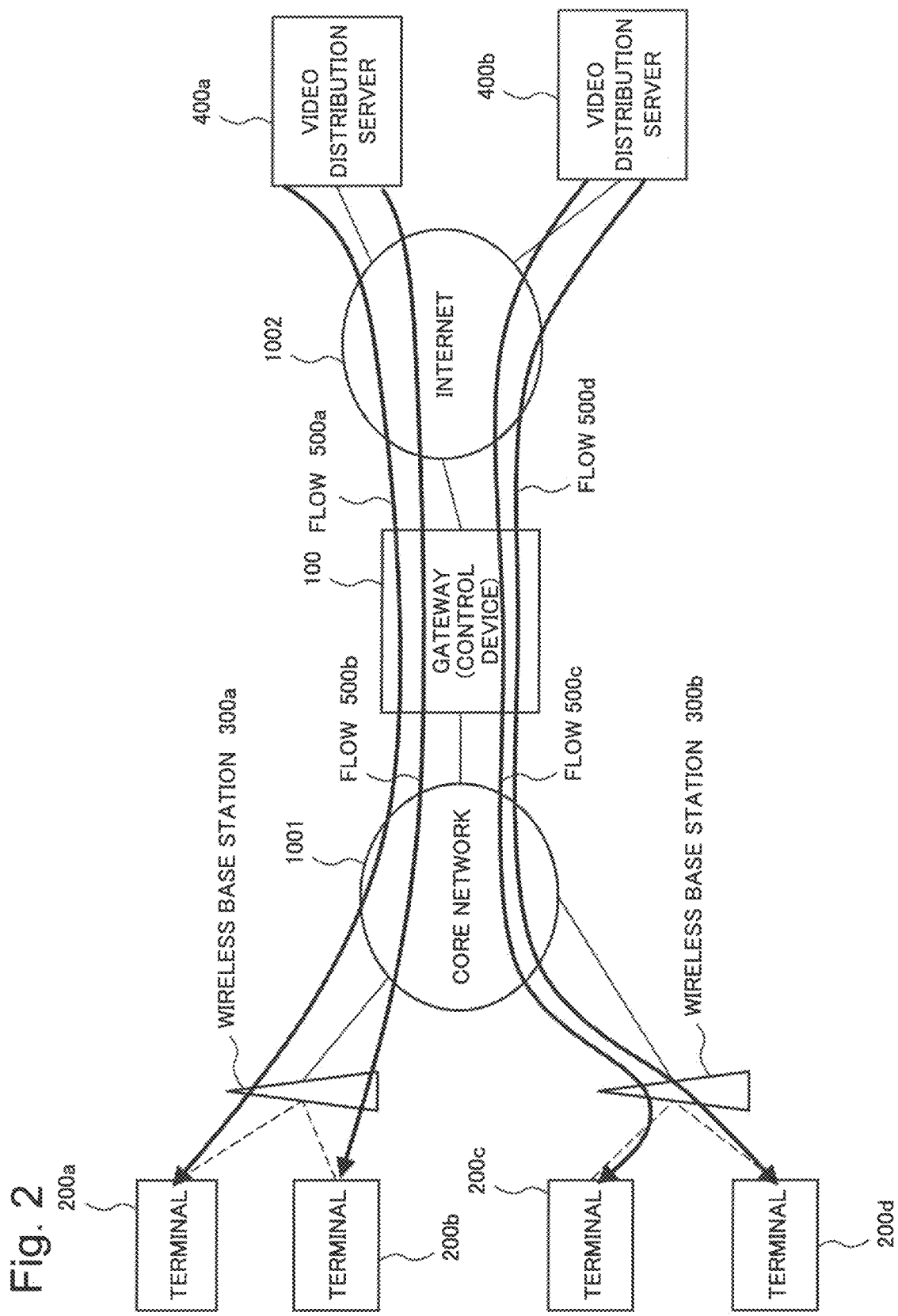
FIG. 2 is a configuration diagram illustrating an example of a communication environment in a communication system according to a second exemplary embodiment of the present invention.

First, a configuration of the present exemplary embodiment will be described below with reference to FIG. 2. FIG. 2 is a configuration diagram illustrating an example of a communication environment in a communication system according to the second exemplary embodiment of the present invention. Referring to FIG. 2, the present exemplary embodiment includes a gateway 100, terminals 200a to 200d (hereinafter denoted by 200a to d), wireless base stations 300a and 300b (hereinafter denoted by 300a and b), and video distribution servers 400a and 400b (hereinafter denoted by 400a and b). The gateway 100 includes the configuration of the control device 1 in the first exemplary embodiment, as will be described later.

Units of the gateway 100, the terminals 200a to d, and the video distribution servers 400a and b may be configured by dedicated hardware devices or logic circuits. Alternatively, the gateway 100, the terminals 200a to d, and the video distribution servers 400a and b may be configured by typical information processing devices (computers) that operate under the control of computer programs (software programs) executed using a CPU (Central Processing Unit, not depicted). Note that an exemplary hardware configuration in which each of the gateway 100, the terminals 200a to d, and the video distribution servers 400a and b is implemented by a computer will be described later with reference to FIG. 6.

The gateway 100 connects the Internet (a first network) 1002 with a core network (a second network) 1001. The plurality of terminals 200a to d are connected to the core network 1001 through the wireless base stations 300a and b. On the other hand, the video distribution servers 400a and b which distribute video contents are connected to the Internet 1002. The terminals 200a to d transmit video distribution requests to the video distribution servers 400a and b through the core network 1001 and the Internet 1002. The video distribution servers 400a and b distribute video contents responsive to video distribution requests to the terminals 200a to d through the Internet 1002 and the core network 1001. In other words, the gateway 100 in the present exemplary embodiment is located in a position through which distribution traffic flows of all video contents directed from the video distribution servers 400a and b to the terminals 200a to d pass.

Each of the terminals 200a to d transmits a video distribution request at any given point in time. Accordingly, many video distribution requests can be transmitted incidentally at times close to one another. In such a case, video distribution traffic responding to the video distribution requests flows into the core network 1001 from the video distribution servers 400a and b through the gateway 100. In such a situation, when the traffic volume (total communication volume) of the video distribution traffic exceeds the bandwidth capacity of the core network 1001, packet losses and large communication delays occur. This results in a problem that content playback quality at the terminals 200a to d seriously degrades.

The present exemplary embodiment is one example that assumes that when bursty video distribution traffic as described above occurs, the gateway 100 prevents an excess of bandwidth capacity on the core network 1001. The gateway 100 performs bandwidth reduction on some of the flows included in video distribution traffic. Specifically, video distribution traffic flowing into the gateway 100 through the internet 1002 in the present exemplary embodiment is equivalent to the input traffic 10 in the first exemplary embodiment. Similarly, traffic sent out from the gateway 100 to the core network 1001 is equivalent to the output traffic 11 in the first exemplary embodiment.

The gateway 100 is based on the control device 1 in the first exemplary embodiment. The gateway 100 includes components of a control device that is based on the control device 1 according to the first exemplary embodiment, and functional units, not depicted, that implement gateway functions. Hereinafter, the control device part of the gateway 100 that is based on the control device 1 will be also referred to as the control device 100. The components of the control device 100 in the gateway 100 may be connected to an output port in the gateway 100 on the core network 1001 side. Alternatively, the components of the control device 100 may be connected to an output port for some flows transferred by a routing processing unit or the like, not depicted, as targets of bandwidth capacity control among traffic flows to be output to the core network 1001 side.

Figure 3:
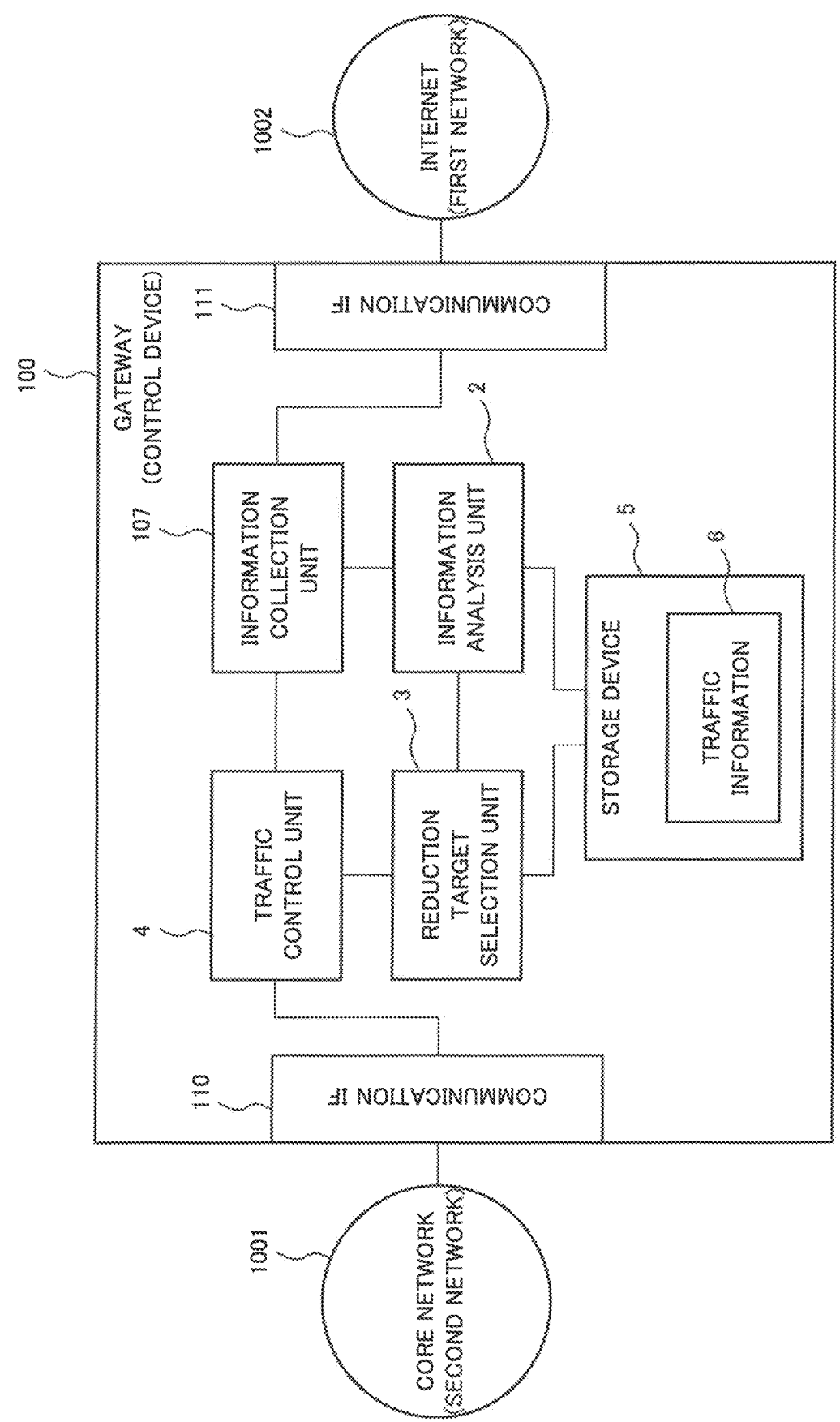
FIG. 3 is a block diagram illustrating a configuration of a gateway (control device) 100 according to the second exemplary embodiment of the present invention.

A configuration of the gateway (control device) 100 will be described next with reference to FIG. 3. FIG. 3 is a block diagram illustrating a configuration of the gateway 100 (control device) according to the second exemplary embodiment of the present invention. Referring to FIG. 3, the gateway 100 includes an information analysis unit 2, a reduction target selection unit 3, a traffic control unit 4, a storage device 5, an information collection unit 107, and communication interfaces (IF) 110 and 111. The storage device 5 is capable of storing traffic information 6. The storage device 5 is implemented by a semiconductor memory device or a disk device, for example.

The present exemplary embodiment differs from the first exemplary embodiment in that the present exemplary embodiment includes the information collection unit 107 and the communication IFs 110 and 111.

The communication IF 110 is an interface capable of transmitting to and receiving from the core network 1001. The communication IF 111 is an interface capable of transmitting to and receiving from the Internet 1002.

The information collection unit 107 extracts, from each flow included in input traffic 10 received from the Internet 1002 through the communication IF 111, information about the flow such as header information including at least a communication volume on a flow-by-flow basis. The information collection unit 107 then outputs the extracted information (extraction information) to the information analysis unit 2. Further, the information collection unit 107 outputs the received input traffic 10 to the traffic control unit 4.

Structures and specifics of the information analysis unit 2, the reduction target selection unit 3, and the traffic control unit 4 in the present exemplary embodiment are basically the same as those in the first exemplary embodiment descried above, except the following differences.

First, the information analysis unit 2 measures a communication volume per measurement time interval of each flow included in input traffic 10 on the basis of extraction information acquired from the information collection unit 107. Further, the information analysis unit 2 computes the total communication volume of the input traffic 10 on the basis of the communication volume of each flow. The information analysis unit 2 then controls the starting and ending of a traffic volume reduction processing sequence, which is based on the first exemplary embodiment, on the basis of whether or not the total communication volume of the input traffic 10 exceeds a predetermined bandwidth threshold.

The reduction target selection unit 3 computes, as one example of a trend of change in ranking information of each flow, ranking slope information representing a trend of change (movement) in ranking information over a plurality of past measurement time intervals. It is assumed in the present exemplary embodiment by way of example that a ranking slope is the slope of a straight line connecting points representing rankings in two or more past measurement time intervals in a graph having an axis representing time and an axis representing ranking.

Figure 5:
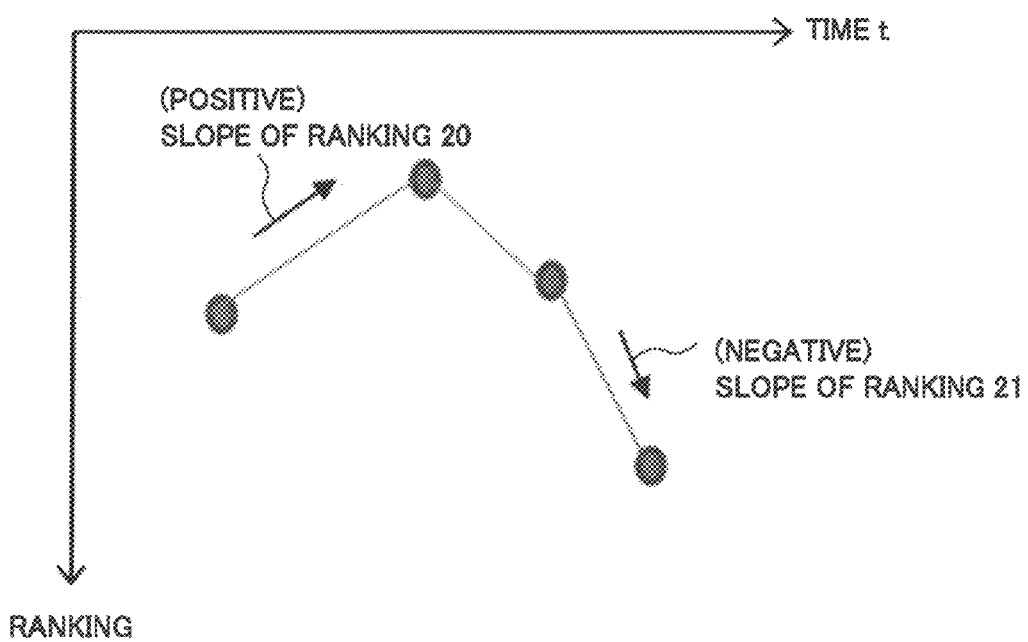
FIG. 5 is a conceptual diagram representing an example of the relationship between movement in ranking and ranking slope in the second exemplary embodiment.

FIG. 5 is a conceptual diagram representing an example of the relationship between movement in ranking and ranking slope in the second exemplary embodiment. FIG. 5 is a diagram illustrating movement in ranking of a given flow, where ranking (information) is used for the vertical axis and time t representing measurement time intervals is used for the horizontal axis. Note that higher positions on the vertical axis represent higher rankings. Referring to FIG. 5, a ranking slope 20 in a time interval in which the ranking is rising has a positive value. On the other hand, a ranking slope 21 in a time interval in which the ranking is falling has a negative value. This means that the reduction target selection unit 3 can determine movement (upward or downward) in ranking in a plurality of past measurement time intervals from the ranking slope information.

Further, the traffic control unit 4 extracts a reduction target flow from input traffic 10 acquired at the information collection unit 107 and performs bandwidth reduction processing on the extracted reduction target flow. The traffic control unit 4 then transmits output traffic 11 resulting from combining the flows included in the remaining input traffic 10 with the reduction target flow subjected to the bandwidth reduction processing to the core network 1001.

The structures and specifics of the information analysis unit 2 and the traffic control unit 4 in the present exemplary embodiment are similar to those in the first exemplary embodiment except the differences described above, and therefore repeated detailed description will be omitted.

The storage device 5 and the traffic information 6 are basically equivalent to the storage device and traffic information in the first exemplary embodiment described above. The structures and specifics of the storage device 5 and the traffic information 6 are similar to those in the first exemplary embodiment, and therefore repeated detailed description thereof will be omitted.

Figure 4:
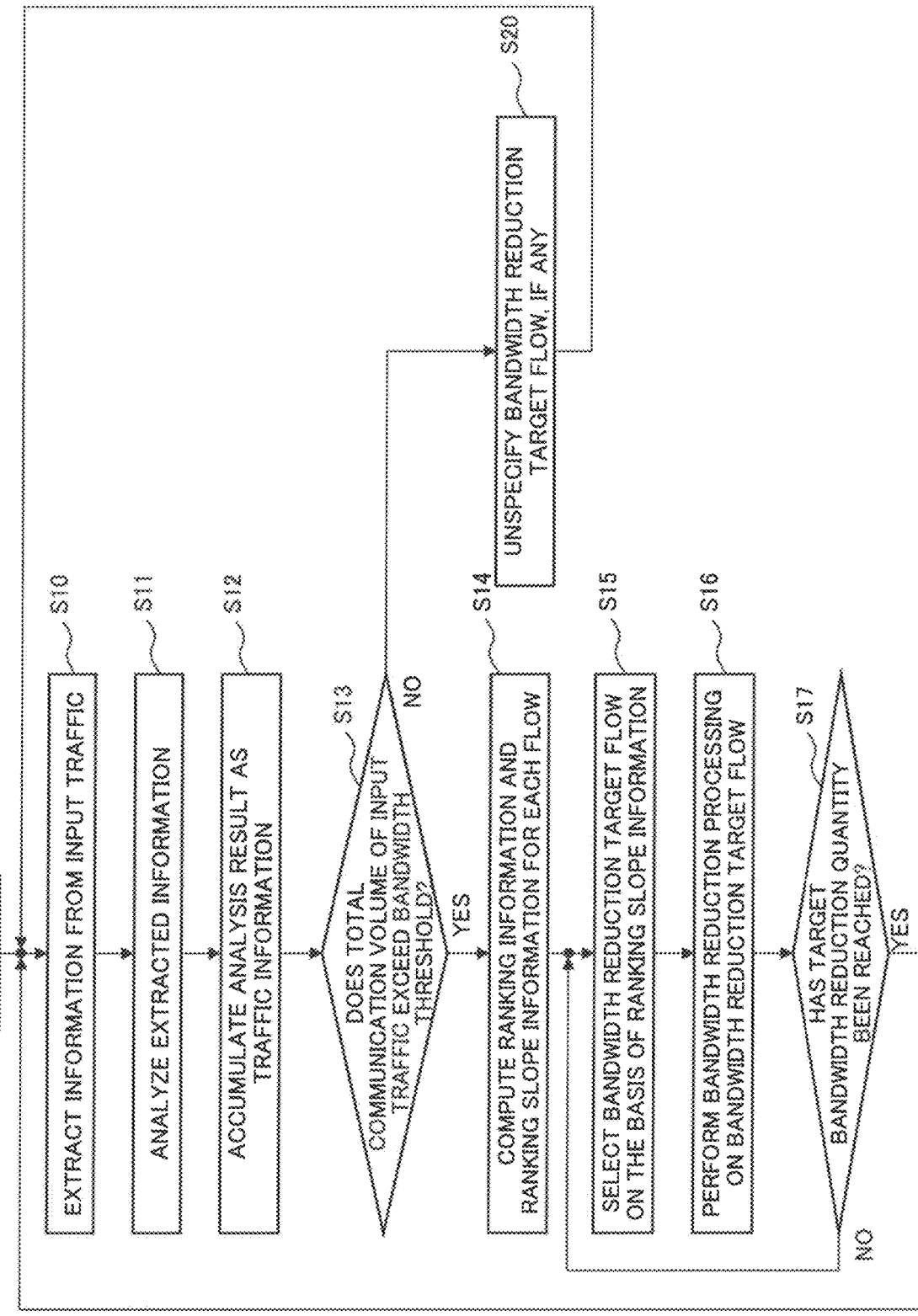
FIG. 4 is a flowchart illustrating an operation of the gateway (control device) 100 in the second exemplary embodiment.

An operation of the present exemplary embodiment including the configuration described above will be described next in detail with reference to FIG. 4. FIG. 4 is a flowchart illustrating an operation of the gateway (control device) 100 in the second exemplary embodiment. In the following, one example will be described in which flows 500a to 500d (hereinafter denoted by 500a to d) depicted in FIG. 2 have occurred. In other words, input traffic 10 includes four flows, 500a to d. Note that the flow 500a is a flow of a video content distributed from the video distribution server 400a to the terminal 200a. Similarly, the flow 500b is a flow of a video content distributed from the video distribution server 400a to the terminal 200b. Similarly, the flow 500c is a flow of a video content distributed from the video distribution server 400b to the terminal 200c. Similarly, the flow 500d is a flow of a video content distributed from the video distribution server 400b to the terminal 200d.

First, the information collection unit 107 extracts information about each flow from the input traffic 10 received through the Internet 1002 (step S10). For example, the information collection unit 107 extracts header information or the like that includes at least a communication volume on a flow-by-flow basis. The information collection unit 107 outputs the extracted information to the information analysis unit 2. Further, the information collection unit 107 outputs the input traffic 10 to the traffic control unit 4.

The information analysis unit 2 analyzes extraction information acquired from the information collection unit 107 over measurement time intervals on a flow-by-flow basis (step S11). For example, each time the information analysis unit 2 receives extraction information during a measurement time interval, the information analysis unit 2 adds a communication volume of each flow.

The information analysis unit 2 generates, in each measurement time interval, a result of the analysis at step S11 as traffic information 6 and accumulates the traffic information 6 in the storage device 5 (step S12). In a specific example, the traffic information 6 in the present exemplary embodiment includes flow identifier information, start time information, and communication volume information. The flow identifier information is information that uniquely identifies a flow. The start time information is the time at which measurement was started (the start time of a measurement time interval) in the traffic information 6. When a flow is started at some midpoint in a measurement time interval, the start time information is the start time of the flow. The communication volume information is a communication volume of a flow associated with the flow identification information and that was added in the measurement time interval.

One example of traffic information 6 in a measurement time interval Ti is given below. Note that the term "information" appended to the name of each element of the traffic information 6 is omitted in the following. Communication volumes are measured in megabytes.

Traffic Information 6 in Measurement Time Interval Ti:
  Flow identifier=flow 500a, start time=t3, communication volume=160
  Flow identifier=flow 500b, start time=t3, communication volume=95
  Flow identifier=flow 500c, start time=t3, communication volume=100
  Flow identifier=flow 500d, start time=t3, communication volume=170

Further, the information analysis unit 2 computes the total communication volume of the input traffic 10 by summing up the communication volumes of the flows or the like. The information analysis unit 2 then determines whether or not the total communication volume of the input traffic 10 exceeds a bandwidth threshold (step S13). Note that the bandwidth threshold may be set on the basis of the bandwidth capacity of the core network 1001, for example.

When the information analysis unit 2 determines that the total communication volume of the input traffic 10 exceeds the bandwidth threshold (YES at step S13), the gateway 100 performs reduction of the traffic. Specifically, the information analysis unit 2 directs the reduction target selection unit 3 to select a reduction target flow. The reduction target selection unit 3 computes (analyzes) ranking information and ranking slope information for each flow in a plurality of past measurement time intervals (step S14).

It is assumed in the present exemplary embodiment that the reduction target selection unit 3 analyzes traffic information 6 in three past measurement time intervals Ti to Ti−2, for example. In a specific example, the reduction target selection unit 3 reads out traffic information 6 in a measurement time interval Ti and, in addition, two past measurement time intervals Ti−1 and Ti−2 from the storage device 5. Traffic information 6 in measurement time intervals Ti−1 and Ti−2 is given below as an example.

Traffic Information 6 in Measurement Time Interval Ti−1:
 Flow identifier=flow 500a, start time=t2, communication volume=120
 Flow identifier=flow 500b, start time=t2, communication volume=130
 Flow identifier=flow 500c, start time=t2, communication volume=85
 Flow identifier=flow 500d, start time=t2, communication volume=180

Traffic Information 6 in Measurement Time Interval Ti−2:
 Flow identifier=flow 500a, start time=t1, communication volume=70
 Flow identifier=flow 500b, start time=t1, communication volume=120
 Flow identifier=flow 500c, start time=t1, communication volume=90
 Flow identifier=flow 500d, start time=t1, communication volume=185

First, the reduction target selection unit 3 computes pieces of ranking information that represent places in a rank order (ranking) of flows in the measurement time intervals Ti to Ti−2 given above, where flows having larger communication volumes in the traffic information 6 are in higher places. The pieces of ranking information computed by the reduction target selection unit 3 are given below in chronological order of measurement time intervals. Note that the flows are indicated using reference sign parts of flow identifiers in the ranking lists in the ranking information given below.

Ranking Information in Measurement Time Interval Ti−2:
 First place=500d, second place=500b, third place=500c, fourth place=500a Ranking Information in Measurement Time Interval Ti−1:
 First place=500d, second place=500b, third place=500a, fourth place=500c Ranking Information in Measurement Time Interval Ti:
 First place=500d, second place=500a, third place=500c, fourth place=500b The reduction target selection unit 3 then computes ranking slope information for each flow. The ranking slope information in the present exemplary embodiment is information that represents a trend of change in ranking as a slope. As described above, it is assumed in the present exemplary embodiment by way of example that the ranking slope is the slope of a straight line connecting points representing rankings in two or more past measurement time intervals in a graph having an axis representing time and an axis representing ranking. The slope of the straight line between two points can be obtained by dividing (amount of change in ranking) by (amount of change in time), for example. In the present exemplary embodiment, the reduction target selection unit 3 obtains a ranking slope for each set of two successive measurement time intervals, for example. In other words, if "time" is considered as a "measurement time interval", (amount of change in time) given above is "1". Accordingly, ranking slope information is the amount of change in ranking itself.

Specifically, when ranking rises one place, for example, ranking slope information is "1". Similarly, when ranking falls two places, ranking slope information is "−2". Ranking slope information for a time interval in which ranking has not changed is "0".

In the case of the measurement time intervals Ti to Ti−2 given above, the reduction target selection unit 3 obtains slopes in the two measurement time intervals Ti−1 to Ti−2 and Ti to Ti−1 for each flow. For example, since the ranking slope information of the flow 500a has risen one place in both time intervals, the ranking slope information of the flow 500a is "1" in the both time intervals. Similarly, the ranking slope information of the flow 500b is "0" and "−2". The ranking slope information of the flow 500c is "−1" and "1". The ranking slope information of the flow 500d is "0" in both time intervals since the ranking slope information of the flow 500d remained in first place in the both time intervals.

The reduction target selection unit 3 then selects a flow whose bandwidth is to be reduced (a reduction target flow) on the basis of the ranking slope information (step S15). For example, the reduction target selection unit 3 evaluates a flow that has the highest rising trend of ranking on the basis of the sum of a plurality of ranking slopes. Specifically, the reduction target selection unit 3 first adds two pieces of ranking slope information together for each flow. Specifically, the sums of pieces of ranking slope information of the flows 500a to d are "2", "−2", "0", and "0", respectively. The reduction target selection unit 3 then selects the flow 500a which has the largest sum as a reduction target flow. In this way, the reduction target selection unit 3 can recognize that access that provides the flow 500a is continuously increasing and can select the flow 500a as a reduction target flow. The reduction target selection unit 3 provides the flow identifier indicating the selected reduction target flow to the traffic control unit 4.

The traffic control unit 4 then performs bandwidth reduction processing on the selected reduction target flow (step S16). The traffic control unit 4 extracts the reduction target flow from the input traffic 10 acquired from the information collection unit 107 at step S10, and performs the bandwidth reduction processing on the extracted flow. For example, the traffic control unit 4 may perform traffic compression on the flow 500a by using transcoding or the like.

The traffic control unit 4 then determines whether or not the communication volume reduced by the bandwidth reduction processing has reached a target quantity of bandwidth reduction (hereinafter referred to as the "target bandwidth reduction quantity") (step S17). The target bandwidth reduction quantity is a difference between the total communication volume of the input traffic 10 and the bandwidth threshold (step S13).

When the target bandwidth reduction quantity has not been reached (NO at step S17), the traffic control unit 4 directs the reduction target selection unit 3 to add a next reduction target flow. Then, the reduction target selection unit 3 returns to step S15. The reduction target selection unit 3 then selects a next (new) reduction target flow from among the remaining flows excluding the already selected flow. The process from step S15 to step S17 is repeated until the target bandwidth reduction quantity is reached.

When the target bandwidth reduction quantity has been reached (YES at step S17), the traffic control unit 4 combines the reduction target flow(s) subjected to the bandwidth reduction processing with the remaining flows included in the input traffic 10 and transmits the combined flows as output traffic 11 through the communication IF 110. Then the process returns to step S10. The bandwidth reduction processing described above is repeated until it is determined at step S13 that the total communication volume of the input traffic 10 is less than or equal to the bandwidth threshold. Meanwhile, the traffic control unit 4 may continuously execute the process from the bandwidth reduction processing on a reduction target flow to transmission of the output traffic 11 until the reduction target flow is unspecified or another reduction target flow is specified.

Note that if there is a flow that has been already selected as a reduction target flow (preceding reduction target flow) when the process from step S15 to step S17 is repeated, the traffic control unit 4 may perform the bandwidth reduction processing on the preceding reduction target flow as well at step S16. Alternatively, at step S15, if the target bandwidth reduction quantity is not reached after performing bandwidth reduction on the preceding reduction target flow, the reduction target selection unit 3 may operate to select a new reduction target flow. Alternatively, at step S15, if the communication volume of the preceding reduction target flow satisfies a predetermined condition, such as being smaller than a predetermined threshold, the reduction target selection unit 3 may select a new reduction target flow and may unspecify the preceding reduction target flow.

When the total communication volume of the input traffic 10 becomes lower than or equal to the bandwidth threshold (NO at step S13) and if there is a reduction target flow, the information analysis unit 2 unspecifies bandwidth reduction of the reduction target flow (step S20). Specifically, the information analysis unit 2 may direct the traffic control unit 4 to stop bandwidth reduction processing on all flows, including the reduction target flow and the preceding reduction target flow mentioned above.

As described above, the present exemplary embodiment has the advantageous effect of being able to reduce a traffic volume that exceeds the bandwidth capacity of a network at an early stage in response to a change in traffic volume.

This is because the reduction target selection unit 3 selects a flow whose communication volume ranking has a rising trend as a reduction target flow whose traffic is to be reduced.

For example, in the method in PTL 1 described earlier in the "Background Art" section, a flow 500*d* that has the largest communication volume in the most recent measurement time interval Ti is selected as a reduction target flow. In contrast, the reduction target selection unit 3 in the present exemplary embodiment can select as a reduction target flow a flow 500*a* that is not yet the largest in terms of the communication volume so far but has the highest rising trend of ranking and is likely to have the largest communication volume in a short time. If the ranking of the flow 500*a* continues rising and, as a result, the flow 500*a* has ranked in first place in the next measurement time interval Ti+1, the flow 500*a* is selected in the next measurement interval in the method in PTL 1, which is later than in the present exemplary embodiment.

Since the reduction target selection unit 3 in the present exemplary embodiment predicts that a communication volume will be the largest on the basis of a rising trend of ranking of the flow 500*a*, the reduction target selection unit 3 can select the flow 500*a* as a bandwidth reduction processing target shortly before the communication volume of the flow 500*a* becomes the largest. Consequently, the present exemplary embodiment can respond to a change in traffic earlier than PTL 1.

(Variations of Second Exemplary Embodiment)

The following variations of the present exemplary embodiment can be contemplated.

For example, bandwidth reduction processing with a higher degree of accuracy of prediction of traffic changes can be achieved by grouping flows that have similar traffic trends and controlling the flows on a group-by-group basis. In this variation, an information collection unit 107 collects information that serves as an index for the grouping (index information) in addition to communication volumes on a flow-by-flow basis. For example, the information collection unit 107 may acquire a content type such as "sports" or "movies". Further, an information analysis unit 2 groups flows into flow groups on the basis of the index information. For example, flows of the same content type may be classified into the same flow group. The information analysis unit 2 generates traffic information by incorporating flow group information representing a flow group into the traffic information 6 of each flow.

Then, a reduction target selection unit 3 selects an additional reduction target flow on the basis of a flow group of a previously selected reduction target flow. For example, in a situation such as when the target bandwidth reduction quantity has not been reached at step S17 (FIG. 4), the reduction target selection unit 3 may select as an additional reduction target flow a flow that belongs to the same flow group as a previously selected reduction target flow. Alternatively, when there is a preceding reduction target flow, for example, the reduction target selection unit 3 may select a flow that belongs to the same flow group as the preceding reduction target flow at step S15 regardless of ranking slopes. In other words, the reduction target selection unit 3 can select a flow as a bandwidth reduction target at an early stage without waiting until the same traffic trend is measured for a flow group that is known to have the same traffic trend.

In content distribution services, access concentration on the same type of content such as "sports", for example, often occurs. The present variation can respond to such access concentration with a high degree of accuracy.

In another variation, selective bandwidth reduction processing can be achieved by selecting a reduction target flow in accordance with environmental conditions or the like of terminals 200*a* to *d* that have requested flows. In this variation, an information collection unit 107 collects category information concerning the requester of each flow, such as terminal's environment, in addition to a communication volume of each flow. For example, the information collection unit 107 may acquire position information or a device name of a terminal. Further, an information analysis unit 2 generates traffic information by adding the category information collected by the information collection unit 107 to the traffic information 6.

Then, when a reduction target selection unit 3 selects a reduction target flow at step S15, the reduction target selection unit 3 classifies flows on the basis of the category information. Further, the reduction target selection unit 3 compiles ranking slope information (trends of change in ranking information) of the flows included in the same category. The reduction target selection unit 3 selects flows that included in the same category as reduction target flows together at a time on the basis of the compiled ranking slope information.

For example, the reduction target selection unit 3 may sum up the ranking slopes of all flows whose position information indicates the same position or positions close to one another. The reduction target selection unit 3 may then select flows associated with position information with the largest total of ranking slopes together at a time as reduction target flows. This has an advantageous effect of enabling local traffic bandwidth reduction.

Further, for example, the reduction target selection unit 3 may sum up the ranking slopes of all flows classified under the same device name. The reduction target selection unit 3 may then select the flows under the device name with the largest sum of ranking slopes together at a time as reduction target flows. This has the advantageous effect of enabling traffic bandwidth reduction on a particular device.

Further, another variation as given below can be contemplated.

For example, while the present exemplary embodiment is directed to one-way traffic that flows from the Internet 1002 to the core network 1001 for effective description, the present exemplary embodiment is also applicable in a mode in which bidirectional traffic flows are concurrently controlled.

Further, the order and execution bodies of some of the operations illustrated in the flowchart of FIG. 4, for example, may be changed. The operation of determining whether or not the total communication volume of input traffic 10 exceeds a bandwidth threshold (step S13) may be performed, for example, after the information collection unit 107 has acquired information about communication volumes at step S10. Moreover, before the bandwidth reduction processing on a bandwidth reduction target flow (step S16), the reduction target selection unit 3 may determine, on the basis of bandwidth reduction quantity estimation, whether or not the target bandwidth reduction quantity will be reached (step S17).

Further, ranking slope information, for example, may be information other than the information described above as long as the information represents a trend of change in ranking, such as a ranking change rate.

Note that each of the variations of the second exemplary embodiment described above can be also applied as a variation based on the first exemplary embodiment. For example, the operation performed by the information collection unit 107 may be performed by an information analysis unit 2 or the like.

(Examples of Hardware Configuration)

Note that each of the units depicted in FIGS. 1 to 3 in the exemplary embodiments described above may be configured by an independent hardware circuit or can be considered as a functional (processing) unit (a software module) of a software program. However, the units in the figures are depicted as separate configuration blocks for convenience of explanation, and various other configurations can be conceived when the units are implemented. An example of such a hardware environment will be described with reference to FIG. 6.

Figure 6:
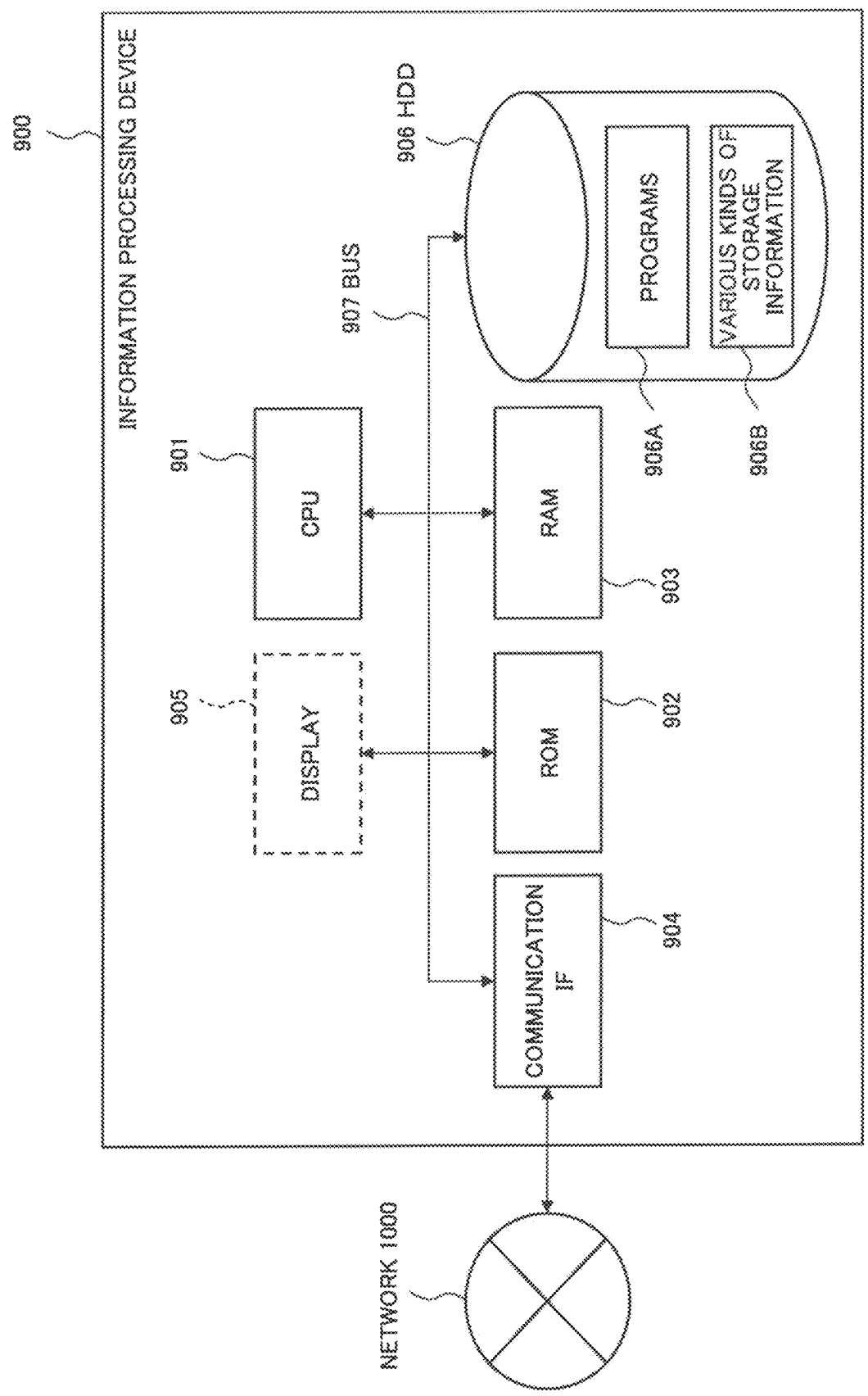
FIG. 6 is a diagram illustrating an exemplary configuration of a computer (information processing device) that is applicable to control devices and communication systems according to exemplary embodiments of the present invention and variations of the exemplary embodiments.

FIG. 6 is a diagram illustrating an exemplary configuration of a computer (information processing device) that is applicable to communication systems according to exemplary embodiments of the present invention and their variations. Specifically, FIG. 6 illustrates a configuration of a computer that can implement at least any one of the control device 1, the gateway (control device) 100, the terminals 200*a* to *d*, and the video distribution servers 400*a* and *b* in the exemplary embodiment described above and is a hardware environment that can implement the functions in the exemplary embodiments described above.

The computer 900 illustrated in FIG. 6 has a configuration including a CPU (Central Processing Unit) 901, a ROM (Read Only Memory) 902, a RAM (Random Access Memory) 903, a communication interface (IF) 904, a display 905, and a hard disk device (HDD) 906 which are interconnected through a bus 907. Note that if the computer illustrated in FIG. 6 functions as any of the control device 1, the gateway (control device) 100, terminals 200*a* to *d*, and the video distribution servers 400*a* and *b*, the display 905 does not always need to be provided.

Further, the communication interface 904 is a typical communication means that provides communication between the computers in each of the exemplary embodiments described above. The hard disk device 906 stores programs 906A and various kinds of storage information 906B. The programs 906A are computer programs for implementing functions equivalent to the blocks (units) illustrated in FIGS. 1 to 3 described above, for example. The various kinds of storage information 906B are information such as the traffic information 6 depicted in FIG. 3, for example. The CPU 901 in such a hardware configuration controls operations of the entire computer 900.

The present invention described above by taking the exemplary embodiments as examples is achieved by providing a computer program that can implement the functions in the block configuration diagrams (FIGS. 1 to 3) or the flowchart (FIG. 4) referred to in the descriptions of the exemplary embodiments, and then reading out and executing the computer program on the CPU 901 of the hardware. The computer program provided into the computer may be stored in the RAM 903, which is a readable/writable transitory storage memory, or a nonvolatile storage device (storage medium) such as the hard disk device 906.

In the case described above, the computer program may be provided to each of the devices by employing any of currently common procedures, such as installing the computer program into each device by means of any of various recording media such as a floppy disk (registered trademark) or a CD-ROM (Compact Disc-ROM) or downloading the computer program from outside through a communication network 1000 such as the Internet. In these cases, the present invention can be considered to be constituted by code constituting the computer program or by a computer-readable storage medium on which the code is recorded.

In the present invention, some or all of the above exemplary embodiments and the modifications thereof may be described as shown in the following supplementary notes, but are not limited to the following supplementary notes.

(Supplementary Note 1)

A control device includes:

information analysis means for performing measurement processing of measuring a communication volume per measurement time interval in each flow included in input traffic and generating traffic information including information representing at least the measured communication volume of each of the flows and a time at which measurement is taken;

reduction target selection means for generating, in each of the measurement time intervals, ranking information representing a ranking which is a rank order of a communication volume of each of the flows in the input traffic, based on the traffic information, and selecting a flow having the ranking that has a trend to change in a particular direction as a reduction target flow whose communication volume is to be reduced, based on a trend of change in ranking information over a plurality of past measurement time intervals; and traffic control means for performing reduction processing of reducing a communication volume on the reduction target flow, and transmitting the reduction target flow subjected to the reduction processing together with another flow included in the input traffic as output traffic.

(Supplementary Note 2)

The control device according to Supplementary Note 1, wherein the reduction target selection means computes, as a trend of change in the ranking information, ranking slope information which is obtained by dividing an amount of change in ranking in a plurality of past measurement time intervals by an amount of change in time, and selects the reduction target flow, based on the ranking slope information.

(Supplementary Note 3)

The control device according to Supplementary Note 1 or 2, further includes information collection means for extracting information about each of the flows included in the input traffic received from a first network, the information including at least the communication volume of the flow, and outputting the extracted information about each of the flows to the information analysis means, wherein the information analysis means performs the measurement processing, based on the information about each of the flows, and controls starting and ending of an operation of the reduction target selection means and the traffic control means, based on whether or not a total communication volume of the input traffic exceeds a predetermined bandwidth threshold, the reduction target selection means adds a new reduction target flow until a communication volume reduced by the reduction processing reaches a target bandwidth reduction quantity which is a difference between the total communication volume and the predetermined bandwidth threshold, and the traffic control means incorporates the new reduction target flow added by the reduction target selection means as a target of the reduction processing and the output traffic, and transmits the output traffic to a second network.

(Supplementary Note 4)

The control device according to Supplementary Note 3, wherein the information collection means additionally collects index information as the information about each of the flows, the index information serving as an index for grouping, the information analysis means groups each of the flows into a flow group, based on the index information, and generates the traffic information by incorporating flow group information representing the flow group into the traffic information, and the reduction target selection means selects the new reduction target flow, based on flow group information of the reduction target flow selected previously.

(Supplementary Note 5)

The control device according to Supplementary Note 4, wherein the information collection means collects a content type as the index information.

(Supplementary Note 6)

The control device according to any one of Supplementary Note 3 to 5, wherein the information collection means additionally collects category information about a requester of each flow as information about each of the flows, and the reduction target selection means computes, as the trend of change in the ranking information, ranking slope information which is obtained by dividing an amount of change in ranking in a plurality of past measurement time intervals by an amount of change in time, and, when selecting the reduction target flow, classifies each of the flows, based on the category information, and selects flows included in a same category as the reduction target flows, based on a result of compilation of the ranking slope information of flows included in the same category.

(Supplementary Note 7)

A traffic control method includes:

performing measurement processing of measuring a communication volume per measurement time interval in each flow included in input traffic;

generating traffic information including information representing at least the measured communication volume of each of the flows and a time at which measurement is taken;

performing ranking information generation processing of generating, in each of the measurement time intervals, ranking information representing a ranking which is a rank order of a communication volume of each of the flows in the input traffic, based on the traffic information;

performing selection processing of selecting a flow having the ranking that has a trend to change in a particular direction as a reduction target flow whose communication volume is to be reduced, based on a trend of change in ranking information over a plurality of past measurement time intervals;

performing reduction processing of reducing a communication volume on the reduction target flow; and performing transmission processing of transmitting the reduction target flow subjected to the reduction processing together with another flow included in the input traffic as output traffic.

(Supplementary Note 8)

The traffic control method according to Supplementary Note 7, wherein the selection processing computes, as a trend of change in the ranking information, ranking slope information which is obtained by dividing an amount of change in ranking in a plurality of past measurement time intervals by an amount of change in time, and selects the reduction target flow, based on the ranking slope information.

(Supplementary Note 9)

The traffic control method according to Supplementary Note 7 or 8, wherein the measurement processing:

extracts information about each of the flows included in the input traffic received from a first network, the information including at least the communication volume of the flow;

performs measurement of a communication volume per measurement time interval in each of the flows, based on the extracted information about each of the flows;

after generation of the traffic information, controls starting and ending of a process from the ranking information generation processing to the reduction processing, based on whether or not a total communication volume of the input traffic exceeds a predetermined bandwidth threshold; and before the transmission processing, performs the selection processing of selecting a new reduction target flow and the reduction processing on the new reduction target flow as an additional reduction target of a communication volume until a communication volume reduced by the reduction processing reaches a target bandwidth reduction quantity that is a difference between the total communication volume and the predetermined bandwidth threshold, and the transmission processing transmits the output traffic including the new reduction target flow subjected to the reduction processing to a second network.

(Supplementary Note 10)

The traffic control method according to Supplementary Note 9, wherein the measurement processing:

additionally collects index information as the information about each of the flows, the index information serving as an index for grouping;

groups each of the flows into a flow group, based on the index information; and, when generating the traffic information, generates the traffic information by incorporating flow group information representing the flow group into the traffic information, and the selection processing of selecting the new reduction target flow selects the new reduction target flow, based on flow group information of the reduction target flow selected previously.

(Supplementary Note 11)

The traffic control method according to Supplementary Note 10, wherein a content type is collected as the index information in the measurement processing.

(Supplementary Note 12)

The traffic control method according to any one of Supplementary Note 9 to 11, wherein the measurement processing additionally collects category information about a requester of each flow as information about each of the flows, and the selection processing:

computes, as the trend of change in the ranking information, ranking slope information which is obtained by dividing an amount of change in ranking in a plurality of past measurement time intervals by an amount of change in time;

classifies each of the flows, based on the category information; and selects flows included in a same category as the reduction target flows, based on a result of compilation of the ranking slope information of flows included in the same category.

(Supplementary Note 13)

A recording medium on which a computer program is recorded, the computer program causing a computer to execute:

information analysis processing of performing measurement processing of measuring a communication volume per measurement time interval in each flow included in input traffic, and generating traffic information including information representing at least the measured communication volume of each of the flows and a time at which measurement is taken;

ranking information generation processing of generating, in each of the measurement time intervals, ranking information representing a ranking which is a rank order of a communication volume of each of the flows in the input traffic, based on the traffic information;

selection processing of selecting a flow having the ranking that has a trend to change in a particular direction as a reduction target flow whose communication volume is to be reduced, based on a trend of change in ranking information over a plurality of past measurement time intervals;

reduction processing of reducing a communication volume on the reduction target flow; and transmission processing of transmitting the reduction target flow subjected to the reduction processing together with another flow included in the input traffic as output traffic.

(Supplementary Note 14)

The recording medium on which the computer program according to Supplementary Note 13 is recorded, wherein the selection processing computes, as a trend of change in the ranking information, ranking slope information which is obtained by dividing an amount of change in ranking in a plurality of past measurement time intervals by an amount of change in time, and selects the reduction target flow, based on the ranking slope information.

(Supplementary Note 15)

The recording medium on which the computer program according to Supplementary Note 13 or 14 is recorded, wherein the information analysis processing:

extracts information about each of the flows included in the input traffic received from a first network, the information including at least the communication volume of the flow;

performs the measurement processing, based on the extracted information about each of the flows;

after generation of the traffic information, controls starting and ending of a process from the ranking information generation processing to the reduction processing, based on whether or not a total communication volume of the input traffic exceeds a predetermined bandwidth threshold; and before the transmission processing, performs the selection processing of selecting a new reduction target flow and the reduction processing on the new reduction target flow as an additional reduction target of a communication volume until a communication volume reduced by the reduction processing reaches a target bandwidth reduction quantity that is a difference between the total communication volume and the predetermined bandwidth threshold, and the transmission processing transmits the output traffic including the new reduction target flow subjected to the reduction processing to a second network.

(Supplementary Note 16)

The recording medium on which the computer program according to Supplementary Note 15 is recorded, wherein the information analysis processing:

additionally collects index information as the information about each of the flows, the index information serving as an index for grouping;

groups each of the flows into a flow group, based on the index information; and, when generating the traffic information, generates the traffic information by incorporating flow group information representing the flow group into the traffic information, and the selection processing of selecting the new reduction target flow selects the new reduction target flow, based on flow group information of the reduction target flow selected previously.

(Supplementary Note 17)

The recording medium on which the computer program according to Supplementary Note 16 is recorded, wherein a content type is collected as the index information in the information analysis processing.

(Supplementary Note 18)

The recording medium on which the computer program according to any one of Supplementary Note 15 to 17 is recorded, wherein the information analysis processing additionally collects category information about a requester of each flow as information about each of the flows, and the selection processing:

computes, as the trend of change in the ranking information, ranking slope information which is obtained by dividing an amount of change in ranking in a plurality of past measurement time intervals by an amount of change in time;

classifies each of the flows, based on the category information; and selects flows included in a same category as the reduction target flows, based on a result of compilation of the ranking slope information of flows included in the same category.

The invention of the present application has been hereinabove explained with reference to the above exemplary embodiments and the like but the invention of the present application is not intended to be limited to the exemplary embodiments described herein. The configuration and the details of the invention of the present application can be changed within the scope of the invention of the present application in various manners that can be understood by a person skilled in the art.

This application is based upon and claims the benefit of priority from Japanese Patent Application No. 2015-037732, filed on Feb. 27, 2015, the entire disclosure of which is incorporated herein.

REFERENCE SIGNS LIST

1 Control device
2 Information analysis unit
3 Reduction target selection unit
4 Traffic control unit
5 Storage device
6 Traffic information
10 Input traffic
11 Output traffic
100 Gateway (control device)
107 Information collection unit
110, 111 Communication interface (IF)
200a to 200d Terminal
300a to 300d Wireless base station
400a to 400b Video distribution server
900 Information processing device (computer)
901 CPU
902 ROM
903 RAM
904 Communication interface (IF)
905 Display
906 Hard disk device (HDD)
906A Programs
906B Various kinds of storage information
907 Bus
1000 Network (communication network)
1001 Core network (second network)
1002 Internet (first network)

The invention claimed is:

1. A control device comprising:
information analysis unit implemented by one or more programmed processors and configured to perform measurement processing of measuring a communication volume per measurement time interval in each flow included in input traffic and generating traffic information including information representing at least the measured communication volume of each of the flows and a time at which measurement is taken;
reduction target selection unit implemented by the one or more programmed processors and configured to generate, in each of the measurement time intervals, ranking information representing a ranking which is a rank order of a communication volume of each of the flows in the input traffic, based on the traffic information, and selecting a flow having the ranking that has a trend to change in a particular direction as a reduction target flow whose communication volume is to be reduced, based on a trend of change in ranking information over a plurality of past measurement time intervals; and
traffic control unit implemented by the one or more programmed processors and configured to perform reduction processing of reducing a communication volume on the reduction target flow, and transmitting the reduction target flow subjected to the reduction processing together with another flow included in the input traffic as output traffic.

2. The control device according to claim 1, wherein
the reduction target selection unit computes, as a trend of change in the ranking information, ranking slope information which is obtained by dividing an amount of change in ranking in a plurality of past measurement time intervals by an amount of change in time, and selects the reduction target flow, based on the ranking slope information.

3. The control device according to claim 1, further comprising information collection unit implemented by the one or more programmed processors and configured to extract information about each of the flows included in the input traffic received from a first network, the information including at least the communication volume of the flow, and outputting the extracted information about each of the flows to the information analysis unit, wherein
the information analysis unit performs the measurement processing, based on the information about each of the flows, and controls starting and ending of an operation of the reduction target selection unit and the traffic control unit, based on whether or not a total communication volume of the input traffic exceeds a predetermined bandwidth threshold,
the reduction target selection unit adds a new reduction target flow until a communication volume reduced by the reduction processing reaches a target bandwidth reduction quantity which is a difference between the total communication volume and the predetermined bandwidth threshold, and
the traffic control unit incorporates the new reduction target flow added by the reduction target selection means as a target of the reduction processing and the output traffic, and transmits the output traffic to a second network.

4. The control device according to claim 3, wherein
the information collection unit additionally collects index information as the information about each of the flows, the index information serving as an index for grouping,
the information analysis unit groups each of the flows into a flow group, based on the index information, and generates the traffic information by incorporating flow group information representing the flow group into the traffic information, and
the reduction target selection unit selects the new reduction target flow, based on flow group information of the reduction target flow selected previously.

5. The control device according to claim 4, wherein
the information collection unit collects a content type as the index information.

6. The control device according to claim 3, wherein
the information collection unit additionally collects category information about a requester of each flow as information about each of the flows, and
the reduction target selection unit computes, as the trend of change in the ranking information, ranking slope information which is obtained by dividing an amount of change in ranking in a plurality of past measurement time intervals by an amount of change in time, and, when selecting the reduction target flow, classifies each of the flows, based on the category information, and selects flows included in a same category as the reduction target flows, based on a result of compilation of the ranking slope information of flows included in the same category.

7. A traffic control method comprising:
performing measurement processing of measuring a communication volume per measurement time interval in each flow included in input traffic;
generating traffic information including information representing at least the measured communication volume of each of the flows and a time at which measurement is taken;
performing ranking information generation processing of generating, in each of the measurement time intervals, ranking information representing a ranking which is a rank order of a communication volume of each of the flows in the input traffic, based on the traffic information;
performing selection processing of selecting a flow having the ranking that has a trend to change in a particular direction as a reduction target flow whose communication volume is to be reduced, based on a trend of change in ranking information over a plurality of past measurement time intervals;
performing reduction processing of reducing a communication volume on the reduction target flow; and
performing transmission processing of transmitting the reduction target flow subjected to the reduction processing together with another flow included in the input traffic as output traffic.

8. The traffic control method according to claim 7, wherein
the selection processing computes, as a trend of change in the ranking information, ranking slope information which is obtained by dividing an amount of change in ranking in a plurality of past measurement time intervals by an amount of change in time, and selects the reduction target flow, based on the ranking slope information.

9. The traffic control method according to claim 7, wherein
the measurement processing:
extracts information about each of the flows included in the input traffic received from a first network, the information including at least the communication volume of the flow;
performs measurement of a communication volume per measurement time interval in each of the flows, based on the extracted information about each of the flows;
after generation of the traffic information, controls starting and ending of a process from the ranking information generation processing to the reduction processing, based on whether or not a total communication volume of the input traffic exceeds a predetermined bandwidth threshold; and
before the transmission processing, performs the selection processing of selecting a new reduction target flow and the reduction processing on the new reduction target flow as an additional reduction target of a communication volume until a communication volume reduced by the reduction processing reaches a target bandwidth reduction quantity that is a difference between the total communication volume and the predetermined bandwidth threshold, and
the transmission processing transmits the output traffic including the new reduction target flow subjected to the reduction processing to a second network.

10. The traffic control method according to claim 9, wherein
the measurement processing:
additionally collects index information as the information about each of the flows, the index information serving as an index for grouping;
groups each of the flows into a flow group, based on the index information; and,
when generating the traffic information, generates the traffic information by incorporating flow group information representing the flow group into the traffic information, and
the selection processing of selecting the new reduction target flow selects the new reduction target flow, based on flow group information of the reduction target flow selected previously.

11. The traffic control method according to claim 10, wherein
a content type is collected as the index information in the measurement processing.

12. The traffic control method according to claim 9, wherein
the measurement processing additionally collects category information about a requester of each flow as information about each of the flows, and
the selection processing:
computes, as the trend of change in the ranking information, ranking slope information which is obtained by dividing an amount of change in ranking in a plurality of past measurement time intervals by an amount of change in time;
classifies each of the flows, based on the category information; and
selects flows included in a same category as the reduction target flows, based on a result of compilation of the ranking slope information of flows included in the same category.

13. A non-transitory computer readable medium for storing a computer program which causes a computer to execute:
information analysis processing of performing measurement processing of measuring a communication volume per measurement time interval in each flow included in input traffic, and generating traffic information including information representing at least the measured communication volume of each of the flows and a time at which measurement is taken;
ranking information generation processing of generating, in each of the measurement time intervals, ranking information representing a ranking which is a rank order of a communication volume of each of the flows in the input traffic, based on the traffic information;
selection processing of selecting a flow having the ranking that has a trend to change in a particular direction as a reduction target flow whose communication volume is to be reduced, based on a trend of change in ranking information over a plurality of past measurement time intervals;
reduction processing of reducing a communication volume on the reduction target flow; and
transmission processing of transmitting the reduction target flow subjected to the reduction processing together with another flow included in the input traffic as output traffic.

14. The computer readable medium on which the computer program according to claim 13 is recorded, wherein the selection processing computes, as a trend of change in the ranking information, ranking slope information which is obtained by dividing an amount of change in ranking in a plurality of past measurement time intervals by an amount of change in time, and selects the reduction target flow, based on the ranking slope information.

15. The computer readable medium on which the computer program according to claim 13 is recorded, wherein the information analysis processing:
   extracts information about each of the flows included in the input traffic received from a first network, the information including at least the communication volume of the flow;
   performs the measurement processing, based on the extracted information about each of the flows;
   after generation of the traffic information, controls starting and ending of a process from the ranking information generation processing to the reduction processing, based on whether or not a total communication volume of the input traffic exceeds a predetermined bandwidth threshold; and
   before the transmission processing, performs the selection processing of selecting a new reduction target flow and the reduction processing on the new reduction target flow as an additional reduction target of a communication volume until a communication volume reduced by the reduction processing reaches a target bandwidth reduction quantity that is a difference between the total communication volume and the predetermined bandwidth threshold, and
   the transmission processing transmits the output traffic including the new reduction target flow subjected to the reduction processing to a second network.

16. The computer readable medium on which the computer program according to claim 15 is recorded, wherein the information analysis processing:
   additionally collects index information as the information about each of the flows, the index information serving as an index for grouping;
   groups each of the flows into a flow group, based on the index information; and,
   when generating the traffic information, generates the traffic information by incorporating flow group information representing the flow group into the traffic information, and
   the selection processing of selecting the new reduction target flow selects the new reduction target flow, based on flow group information of the reduction target flow selected previously.

17. The computer readable medium on which the computer program according to claim 16 is recorded, wherein a content type is collected as the index information in the information analysis processing.

18. The computer readable medium on which the computer program according to claim 15 is recorded, wherein the information analysis processing additionally collects category information about a requester of each flow as information about each of the flows, and
   the selection processing:
   computes, as the trend of change in the ranking information, ranking slope information which is obtained by dividing an amount of change in ranking in a plurality of past measurement time intervals by an amount of change in time;
   classifies each of the flows, based on the category information; and
   selects flows included in a same category as the reduction target flows, based on a result of compilation of the ranking slope information of flows included in the same category.

* * * * *